(12) United States Patent
Bayer

(10) Patent No.: US 6,432,022 B1
(45) Date of Patent: Aug. 13, 2002

(54) LOW-PLAY PLANETARY GEAR MECHANISM

(75) Inventor: Thomas Bayer, Gersheim (DE)

(73) Assignee: Alpha Getriebebau GmbH, Igersheim (DE)

( * ) Notice: Subject to any disclaimer, the term of this patent is extended or adjusted under 35 U.S.C. 154(b) by 0 days.

(21) Appl. No.: 09/575,079

(22) Filed: May 19, 2000

Related U.S. Application Data

(63) Continuation-in-part of application No. 09/191,991, filed on Nov. 13, 1998, now abandoned.

(30) Foreign Application Priority Data

May 15, 1998 (DE) .......................................... 198 21 813

(51) Int. Cl.$^7$ .............................................. F16H 57/04
(52) U.S. Cl. ...................... 475/331; 475/344; 475/901; 74/464; 427/249.19
(58) Field of Search ................................. 475/331, 344, 475/901; 74/464; 427/249.19; 428/408

(56) References Cited

U.S. PATENT DOCUMENTS

| | | | |
|---|---|---|---|
| 2,836,514 A | 5/1958 | Münster et al. | 427/249.19 |
| 2,956,451 A | 10/1960 | Bowman | 475/344 |
| 3,630,098 A | 12/1971 | Oxley | 74/467 |
| 3,656,995 A | 4/1972 | Reedy, Jr. | 427/249.19 |
| 3,900,592 A | 8/1975 | Kennedy et al. | 427/249.19 |
| 3,959,557 A | 5/1976 | Berry | 427/249.19 |
| 4,184,380 A | 1/1980 | Rivin | 74/464 |
| 4,671,125 A * | 6/1987 | Yabunaka | 475/344 |
| 4,679,464 A * | 7/1987 | Castellani | 475/159 |
| 4,860,615 A | 8/1989 | Huber et al. | 475/319 |
| 4,926,715 A | 5/1990 | Hirt et al. | 475/344 |
| 4,944,196 A | 7/1990 | Rivin | 74/465 |
| 4,946,747 A | 8/1990 | Bergmann et al. | 427/250 |
| 5,106,672 A | 4/1992 | Rabe | 74/468 |
| 5,203,224 A | 4/1993 | Honda | 74/464 |
| 5,288,556 A | 2/1994 | Lemelson | 428/408 |
| 5,342,256 A | 8/1994 | Amborn et al. | 475/252 |
| 5,386,756 A * | 2/1995 | Stehle et al. | 80/830 |
| 5,685,797 A | 11/1997 | Barnsby et al. | 475/331 |
| 5,690,577 A | 11/1997 | Enzmann et al. | 475/265 |
| 5,786,098 A | 7/1998 | Walenta et al. | 428/469 |
| 5,879,261 A | 3/1999 | Bayer | 475/347 |

FOREIGN PATENT DOCUMENTS

| | | |
|---|---|---|
| DE | 40 36 209 | 5/1992 |
| DE | 42 41 550 | 6/1994 |
| DE | 196 12 144 | 11/1996 |

OTHER PUBLICATIONS

Sauer (1997) Gleiten ohne Schmieren [Sliding without Lubrication] In: Der Konstrukteur No. 10, pp. 50, 52.
Berger (1993) Verschleißschutz für Zahnräder [Protection against wear for gear wheels] In: Der Konstrukteur, vol. ASB, pp. 92, 94.
Berger(1991) Verschleißschutzschichten für Zahnräder und Wälzlager [Wear-resistant layers for gear wheels and rolling bearings] In: Antriebstechnik, vol. 30, No. 12, pp. 50–53.

* cited by examiner

*Primary Examiner*—Sherry Estremsky
(74) *Attorney, Agent, or Firm*—Collard & Roe, P.C.

(57) ABSTRACT

A low-play planetary gear mechanism for high rotational speeds and low torque transmission and having roller bearings for the parts which rotate within the gear mechanism. The gear mechanism is designed for a long, maintenance-free service life in continuous operation at high drive speeds. To accomplish this, the running surfaces of at least some of the gears are coated with a coating that has a higher wear resistance and a lower coefficient of friction than the respectively associated base material. As such, all of the surfaces of the gear mechanism which come into contact with one another are able to run for long periods at the end of assembly of the gear mechanism. With this gear mechanism, there is no circulating lubricating oil originating from a lubricating-oil collection chamber and which flows freely around any of the moving parts of the gear mechanism.

5 Claims, 1 Drawing Sheet

LOW-PLAY PLANETARY GEAR MECHANISM

This is a continuation-in-part of U.S. patent application Ser. No. 09/191,991, filed on Nov. 13, 1998, now abandonded.

BACKGROUND OF THE INVENTION

1. Field of the Invention

The invention relates to a low-play planetary gear mechanism. In particular, this invention relates to a planetary gear mechanism in which the running surfaces of the gears are coated and do not need lubricant.

2. The Prior Art

In known gear mechanisms of this nature, the running surfaces of the intermeshing gears are lubricated with lubricating oil that circulates freely within the gear mechanism and originates from a lubricating oil collection chamber. In order to prevent the circulating lubricating oil from leaking out, the drive shaft and output shaft are sealed from the gear mechanism casing by radial seals, which provide an effective seal. The radial seals are usually radial oil seal rings that are customary for such purposes.

In continuous operation, the known planetary gear mechanisms that are used when high rotational speeds and low torques are to be transmitted generate high operating temperatures. The drive-side and output-side radial oil seal rings cannot withstand such high temperatures for the service life of the gear mechanism, which is dependent on the other components of the gear mechanism. Consequently, the seal rings must be replaced frequently.

Gear mechanisms which are lubricated in this way in turn present the problems that they become so hot at high rotational speeds that the seals which are required on the drive and output shafts become prematurely defective and have to be replaced. Consequently, it is impossible for such gear mechanisms to operate continuously for extremely long running times without maintenance. The fact that the seals are not sufficiently heat-resistant for the purpose mentioned above has thus made it impossible to achieve extremely high rotational speeds for continuous operation. Furthermore, the radial seals which seal with respect to the outside and are required for oil-lubricated gear mechanisms, owing to the friction which they cause, additionally contribute to the generation of undesirable heat in the gear mechanism.

The present invention overcomes this problem by designing a high-speed gear mechanism which is subjected to low loads and achieves extremely long operating times without maintenance, to operate without any lubricating oil. Some known mechanisms comprise gear mechanisms which operate without lubrication and have transmission elements with a wear-resistant coating. However, all the prior gear mechanisms operating without lubrication were not used as continuously operating gear mechanisms, but only as gear mechanisms for intermittent operation. In this context, intermittent operation means operation in which the gear mechanisms do not run for extremely long periods without interruption, but rather only for relatively short times which may in turn follow on from one another, after a short interruption each time, over what is overall a long period. Such operating sequences arise, for example, if such gear mechanisms are used as handling gear mechanisms, i.e. as robot gear mechanisms such as shown in U.S. Pat. No. 5,203,224 to Honda, in which the respective direction of movement changes, an effect which is achieved by rotation of the elements of the gear mechanism in opposite directions. In Honda, the gear mechanism is operated continuously for less than 1000 hours.

SUMMARY OF THE INVENTION

It is therefore an object of the invention to develop a gear mechanism that does not break down or require maintenance as a result of failed drive-side and/or output-side lubricating oil seals before the end of its service life.

It is another object of the invention to provide a gear mechanism that is suitable for long continuous running times at high drive speeds.

These and other objects of the invention are accomplished by a low-play planetary gear mechanism designed for long, maintenance-free running times, comprising a gear casing, a drive pinion extending into the gear casing, an internal gear fixed to the casing and surrounding the drive pinion, and a plurality of planetary gears which mesh simultaneously with the drive pinion and the internal gear, for high rotational speeds and transmission of low torques. One or more of the drive pinion, internal gear and planetary gears are coated on their running surfaces with a coating having a lower coefficient of friction than the base material of the gear components, such that these components not require lubricating oil.

There are a plurality of roller bearings disposed within the gear casing for supporting the drive shaft and output shaft. These roller bearings are independently lubricated for life. With the present invention, there is no liquid lubricant flowing around the gear mechanism during operation of the gear mechanism.

In a preferred embodiment, both the planetary gears and the internal gear are coated on their running surfaces. Most preferably, the drive pinion, planetary gears and internal gear are all coated on their running surfaces.

The invention reduces the friction losses which arise during operation of the gear mechanism due to its structural design and which cause the heating of the gear mechanism. This solution increases the service life of the drive-side and output-side radial seals by exposing them to the lowest possible operating temperature.

To reduce the operating temperature of the gear mechanism, it is essential that the running surfaces of the intermeshing gears are not lubricated by lubricating oil that circulates freely inside the gear mechanism and originates from a lubricating oil collection chamber. This is because if the lubricating oil circulates freely, relatively high thermal losses are produced as a result of the splashing movement of the lubricating oil alone. Therefore, according to the invention, the gear running surfaces are covered with low-friction, wear-resistant coatings, with the result that the gears are able to efficiently intermesh without circulating lubricating oil. The gears may be entirely free of lubricating oil or may be lubricated for life with a small amount of lubricant.

The drive-side and output-side roller bearings for the drive shaft and output shaft, respectively, may be grease-lubricated endurance roller bearings.

Needle bearings are preferably used for supporting the planetary gears on the planetary gear pin.

Due to the fact that in the gear mechanism design according to the invention there is no lubrication by freely circulating lubricating oil originating from a lubricating oil collection chamber, the drive-side and output-side seals no longer have to be designed to act as lubricating oil seals. As a result, it is possible to use radial seals such as an oil-permeable labyrinth sealing ring or radial sealing ring, which only generate extremely low, or even no friction losses.

Suitable wear-resistant, low-friction running coating on the gear running surfaces are so-called PVD (Physical Vapor Deposition) coatings comprising one or more of the materials Silver TiN, TiCN, TiC, tungsten carbide or gold TiN. These coating materials are already known per se, specifically with regard to the manner in which they are to be applied as PVD coatings and with regard to their low-friction and wear-resistant properties. The running coatings according to the invention are in each case applied to a finish-machined component.

In cases in which small quantities of long-term lubricants are provided for individual components of the gear mechanism, it is necessary to keep the lubricant permanently in the region of the components in question (for example the gears and the drive-side and output-side roller bearings). In the present invention, these components are advantageously accommodated in chambers that are separated from one another as far as possible. Of these three chambers, one accommodates the gears and the other two each accommodate a drive-side or output-side roller bearing. In this context, drive-side and output-side roller bearings are understood to mean all of the roller bearing means which are required on the drive side and the output side, respectively.

The gear mechanism according to the invention is especially suitable for use on machines that produce large quantities of items at high speeds, such as high speed packaging lines for cartons, bags and wrappings, or converting lines for disposable diapers, sanitary napkins, toilet tissue and paper towels, or for printing machines for paper foil, money, cartons and the like. With these machines, it is desirable to have a maintenance free gear mechanism as with the present invention, because stopping the machine for maintenance of the sealing rings as required by the prior art would greatly reduce the production capacity of the machines. It is because of the maintenance free design of the gear mechanism that the mechanism of the present invention has enjoyed considerable commercial success in the United States and elsewhere.

The invention provides a low-play planetary gear mechanism which is suitable for long-term, maintenance-free continuous operation and that is reliably ensured primarily at high rotational speeds and low torques. The invention avoids the problems caused during continuous operation of such a gear mechanism by prematurely failing sliding-contact seals, which are used in the prior mechanisms.

Coating the running surfaces of the gear wheels of the mechanism be ensures maintenance-free operation throughout the entire operating time even for a gear mechanism that is designed for continuous-operation at high rotational speeds. The continuous-operation times which can be achieved in this way amount to several thousand hours and, in particular, rise to continuous-operation times of over 30,000 hours.

The solution according to the invention has made it possible, for the first time, to achieve such high continuous-operation times without maintenance. Such long maintenance-free continuous-operation times were previously impossible, due to premature failure of sliding-contact seals. The premature failure of the sliding-contact seals was caused by excessive thermal loads being imposed on these seals.

Previous standard attempts at increasing the continuous-operation time of planetary gear mechanisms of this nature always consisted in optimizing the oil-flooded lubrication of the planetary gears. In contrast, the present invention provides a gear mechanism in which at least the transmission gear wheels are able to run virtually without atomized oil, or without lubricating oil splashing around within the gear mechanism chamber.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

DETAILED DESCRIPTION OF THE PREFERRED EMBODIMENT

Figure 1:
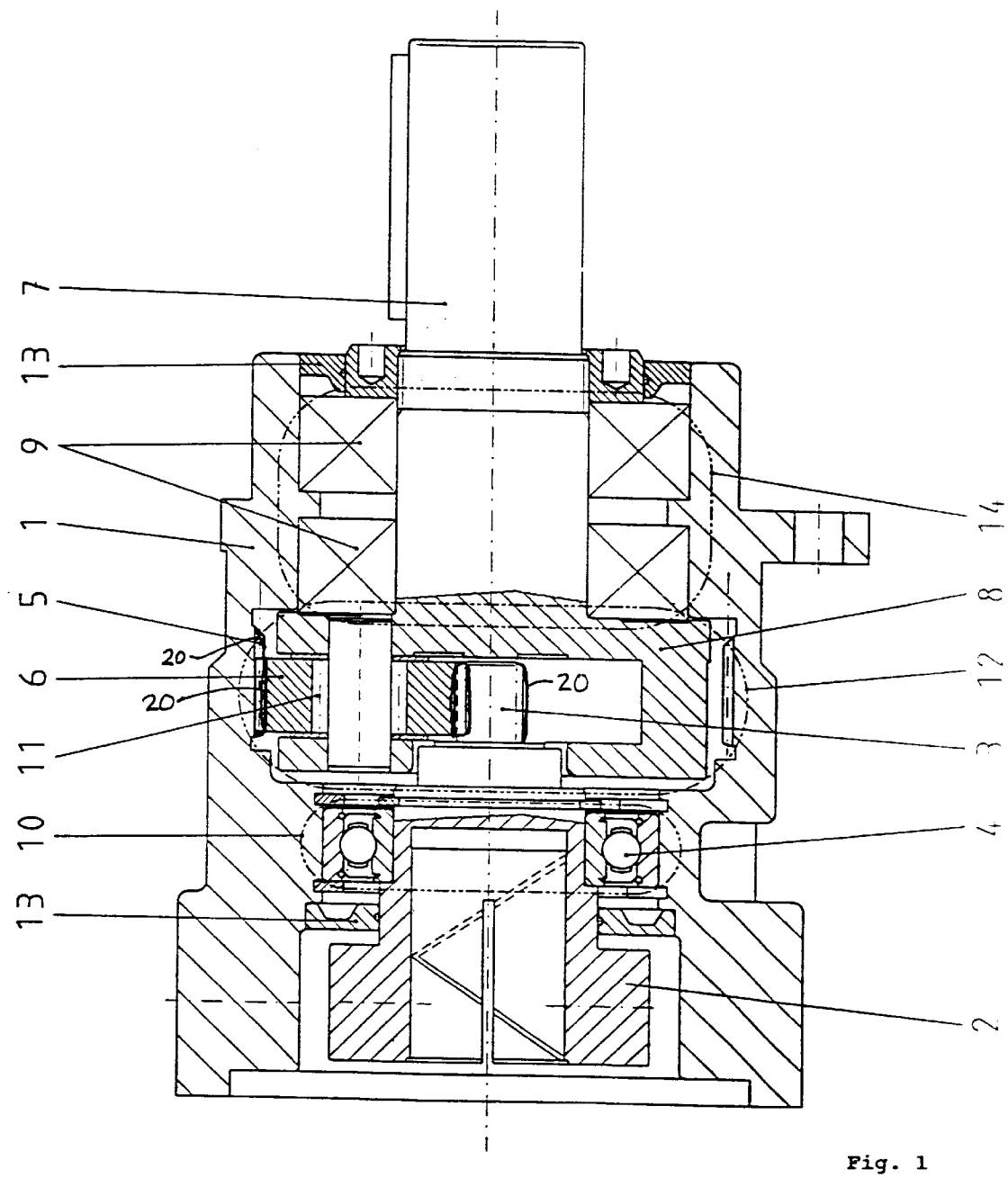
FIG. 1 shows a longitudinal section through a planetary gear mechanism according to the invention.

Referring now in detail to the drawing, FIG. 1, shows a gear casing 1, and a drive shaft 2 with a drive pinion 3 mounted in an axially fixed manner in roller bearings 4. Planetary gears 6 are supported in an internal gear 5 which is fixed to casing 1. Drive pinion 3 drives a satellite carrier 8 which is fixedly connected to an output shaft 7. The unit comprising satellite carrier 8 and output shaft 7 is mounted in an axially fixed manner inside gear casing 1 by roller bearings 9.

The supporting toothed surfaces of drive pinion 3, planetary gears 6 and internal gear 5 are covered with a running surface coating 20 which has been mentioned above and has been applied using the PVD coating process. It is possible, in various alternatives, for all the gears 3, 6 and 5, or only planetary gears 6, or only planetary gears 6 and pinion 3, to be coated.

Roller bearings 4 and 9 are grease-lubricated endurance bearings.

During operation of the gear mechanism, gears 3, 6 and 5 intermesh without being lubricated by circulating lubricating oil. A minimal quantity of grease may be used for lubrication purposes.

Planetary gears 6 are mounted on the planetary gear pin via needle bearings 11.

Drive shaft 2 and output shaft 7 are sealed from gear casing 1 by a labyrinth sealing ring 13. As an alternative, a radial oil seal ring may be fitted on the output side. The sealing ring is oil permeable and generates low or no friction losses.

A total of three chambers 10, 12 and 14, which are separated as far as possible from one another, are provided inside the gear mechanism casing 1. Chamber 12 accommodates gears 3, 5 and 6, and chambers 10 and 14 accommodate roller bearings 4 and 9, respectively. The three chambers 10, 12 and 14 are structurally separated from one another so that small quantities of long-term lubricant provided therein can remain within the chamber area in question.

The planetary gear mechanism according to the invention can be operated without maintenance over the entire running life of the gear mechanism, in particular at drive speeds of at least 3,000 rpm and often up to or greater than 6,000 rpm, for longer than 30,000 hours of continuous operation. Because the friction losses are kept low, there is no heating of the gear mechanism which would reduce the service life, even at high speeds or during continuous operation.

Practical tests carried out with a planetary gear mechanism according to the invention have demonstrated a surprisingly long service life, i.e., at least 30,000 hours.

Accordingly, while only a single embodiment of the present invention have been shown and described, it is obvious that many changes and modifications may be made thereunto without departing from the spirit and scope of the invention.

What is claimed is:

1. A planetary gear mechanism for installation in printing, packaging, and paper and textile manufacturing machines, that can run continuously without maintenance for at least 10,000 hours at drive speeds of at least 3,000 rpm without any liquid lubricant, comprising:

a gear casing connected to an input shaft and an output shaft;

a drive pinion extending into the gear casing;

an internal gear fixed to the casing and surrounding the drive pinion;

an oil-permeable sealing ring sealing the gear casing from each of the input shaft and output shaft;

a plurality of planetary gears which mesh simultaneously with the drive pinion and the internal gear, wherein at least one of said drive pinion, said internal gear and said planetary gears is coated on a running surface thereof with a coating having a lower coefficient of friction and a higher wear resistance than a base material of the drive pinion, the planetary gears and the internal gear, such that said drive pinion, said planetary gears and said internal gear do not require lubricating oil; and a plurality of roller bearings disposed within the gear casing and supporting the drive shaft and output shaft, said roller bearings being independently lubricated for life.

2. The gear mechanism as claimed in claim 1, wherein the planetary gears and internal gear all have running surfaces and wherein at least the running surfaces of the planetary gears and internal gear are coated.

3. The gear mechanism as claimed in claim 2, wherein the drive pinion has a running surface and wherein the running surfaces of the drive pinion, the planetary gears and the internal gear are all coated.

4. The gear mechanism as claimed in claim 1, wherein the coating is formed as a physical vapor deposition coating and includes a material selected from the group consisting of silver TiN, gold TiN, TiCN, TiC, and tungsten carbide.

5. The gear mechanism as claimed in claim 1, wherein three chambers are provided inside the gear casing and separated from each other as far as possible, wherein one chamber accommodates the drive pinion, the internal gear and the planetary gears, and the other two chambers each accommodate roller bearings for a drive shaft and output shaft, respectively.

* * * * *